Nov. 7, 1944.    F. W. CURTIS    2,361,995
METHOD OF MAKING METAL CUTTING TOOLS
Filed Sept. 28, 1942
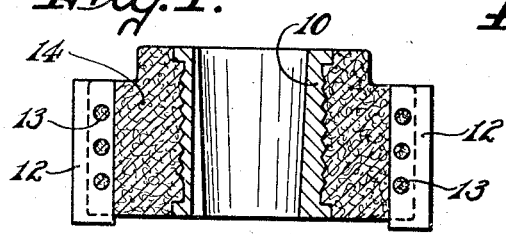
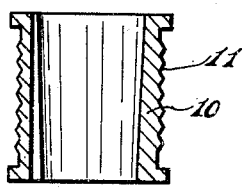
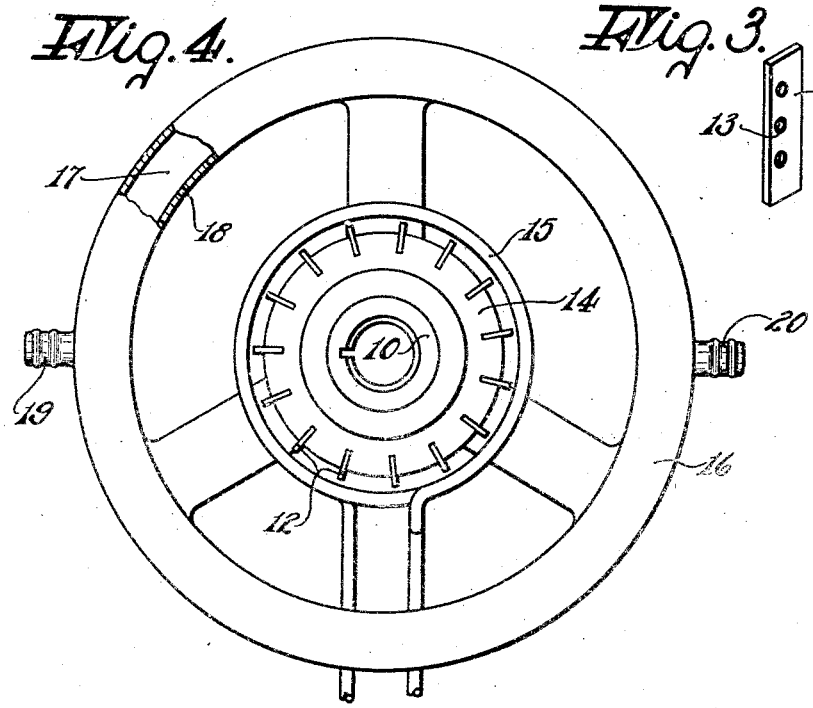
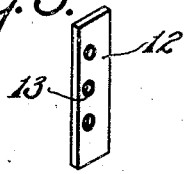
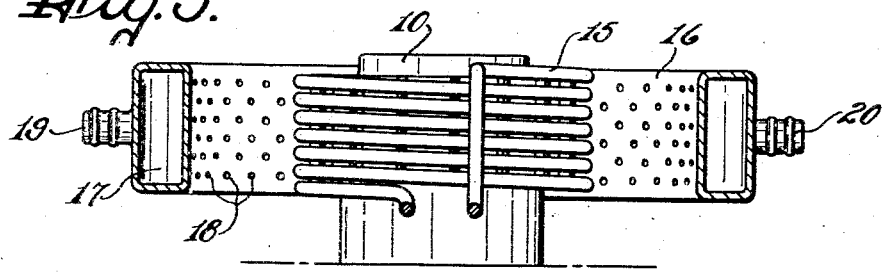
INVENTOR
FRANK W. CURTIS
BY
Chapin + Neal
ATTORNEYS Patented Nov. 7, 1944

2,361,995

UNITED STATES PATENT OFFICE 2,361,995

METHOD OF MAKING METAL CUTTING TOOLS

Frank W. Curtis, Springfield, Mass., assignor to Van Norman Company, a corporation of Massachusetts Application September 28, 1942, Serial No. 459,917

1 Claim. (Cl. 148—10)

This invention relates to an improvement in methods of making cutting tools, particularly in making such tools as are shown in my co-pending application for patent, Serial No. 459,916, filed Sept. 28, 1942. One object of the invention is to provide a method by which cutting tools having greater uniformity in the hardness of successive cutting edges may be secured. A further object is to provide an improved method of making cutting tools which will greatly reduce the cost of the materials and labor involved.

In the co-pending application referred to, an improved cutting tool, such for example as a milling cutter, has been described in which the cutting edges are formed from metallic strips embedded in a matrix of an organic plastic having certain characteristics therein set forth. The present invention is directed to a method by which these tools may be constructed. In accordance with this method the cutting portions of the tool are formed from steel strips of a composition such as a high carbon steel suitable for hardening upon heating and quenching. These tools are secured, as by molding, in a body of a hardened thermo-setting organic plastic, such for example as a phenol-formaldehyde resin having a comminuted textile material such as chopped canvas embedded therein. The blades are formed with holes or other locking areas so that they will be held firmly against movement in the matrix, and are positioned so that their cutting portions project into a surface of revolution with its axis coincident with that of the center. When assembled the blades are unhardened, and after molding they are subjected to an induction hardening process by which the outer portions of the blades extending beyond the matrix alone are hardened. I have found that this operation may be performed with sufficient rapidity so that the portion of the blade adjacent the cutting surface is heated to a red heat, while the heat does not have time to move by conduction into the body of the blade sufficiently to damage the plastic matrix, provided that immediately this heat has been reached, the tool is quenched as by water jets and the peripheral surfaces of the blades are then ground to a true cylindrical or other geometrical form. The time relationship specified is of great importance, as the plastic matrix is injured by a heat far below the hardening temperature.

The invention will now be described in connection with the accompanying drawing, in which Fig. 1 is a cross-section of a milling cutter to which the invention may be applied;

Figs. 2 and 3 are details of certain portions of the cutter shown in Fig. 1; and Figs. 4 and 5 are respectively a plan and a sectional elevation of an induction hardening apparatus.

The cutter shown in Fig. 1 is preferably formed on a sleeve 10 having its inner surface tapered or otherwise formed for reception upon a spindle or arbor. The outer surface of the sleeve is preferably roughened by knurling 11 to increase the bond by which it is to be held in the plastic matrix. The blades 12 preferably formed with holes 13 are then mounted in a suitable mold together with the sleeve, and the space between filled with comminuted plastic and textile material which is subjected to heat and pressure until it fits to a solid matrix 14. Up to this time the blades have been left unhardened.

The assembled cutter is then placed within a coil 15 of high conducting material, such as a helical copper coil, and also within an annular member 16 having a water jacket 17 and a plurality of inwardly directed holes 18. Inlet and outlet pipe 19 and 20 may be provided to supply water under pressure. A high frequency current is passed through the coil 15, which causes the portions of the blades next to the coil to become heated. The effect of the high frequency current decreases rapidly with distance, so that the portions of the blade embedded in the plastic will not initially become heated. After a time, which must be carefully controlled to cause the outside of the blades to become heated to the desired so-called critical point without substantially heating the embedded portions, the current is shut off. Water is immediately admitted through the perforations 18 for a sufficient time to cause the blades to become chilled to the necessary degree for hardening. The rapidity with which the water is applied is of great importance, as a substantial time lag will permit heat to pass by conduction into the embedded portions of the blades and therefrom to the plastic matrix, which as stated above is injured by heat at a temperature much less than said critical temperature. The blades may then be ground peripherally with the cutter mounted on an arbor, and any desired backing off operations may be performed.

What I claim is:

A method of making a cutting tool which comprises embedding a plurality of unhardened steel blades in a matrix of a hardened organic plastic with portions of the blades projecting beyond the surface of the matrix with their peripheries in the form of a surface of revolution, locating the assembly within a conducting coil conforming to the peripheral boundary of the cutter blade series but spaced radially therefrom, passing a high-frequency current through the coil for a length of time sufficient to heat the outer portions of the blades to the temperature necessary for the hardening process, and quenching said blades before said heat can warm the embedded portions of the blades to a temperature injurious to said plastic.

FRANK W. CURTIS.

---

CERTIFICATE OF CORRECTION.

Patent No. 2,361,995. November 7, 1944.

FRANK W. CURTIS.

It is hereby certified that error appears in the printed specification of the above numbered patent requiring correction as follows: Page 1, first column, line 35, for the word "center" read --cutter--; and that the said Letters Patent should be read with this correction therein that the same may conform to the record of the case in the Patent Office.

Signed and sealed this 16th day of January, A. D. 1945.

Leslie Frazer (Seal) Acting Commissioner of Patents.